(12) United States Patent
Fu et al.

(10) Patent No.: US 11,762,122 B2
(45) Date of Patent: Sep. 19, 2023

(54) DEVICE AND METHOD FOR REDUCING TURN-OFF TIME OF TRANSIENT ELECTROMAGNETIC TRANSMITTING SIGNAL

(71) Applicant: HUNAN UNIVERSITY OF SCIENCE AND TECHNOLOGY, Xiangtan (CN)

(72) Inventors: Guohong Fu, Xiangtan (CN); Songyuan Fu, Xiangtan (CN); Hui Cheng, Xiangtan (CN); Tianchun Yang, Xiangtan (CN)

(73) Assignee: HUNAN UNIVERSITY OF SCIENCE AND TECHNOLOGY, Xiangtan (CN)

( * ) Notice: Subject to any disclaimer, the term of this patent is extended or adjusted under 35 U.S.C. 154(b) by 64 days.

(21) Appl. No.: 17/687,126

(22) Filed: Mar. 4, 2022

(65) Prior Publication Data

US 2022/0221612 A1     Jul. 14, 2022

Related U.S. Application Data

(63) Continuation of application No. PCT/CN2021/084292, filed on Mar. 31, 2021.

(30) Foreign Application Priority Data

Mar. 31, 2020   (CN) .......................... 202010242759.6

(51) Int. Cl.
    *G01V 3/38*          (2006.01)
    *G01V 3/10*          (2006.01)
    *G01V 3/165*        (2006.01)

(52) U.S. Cl.
    CPC ................. *G01V 3/38* (2013.01); *G01V 3/10* (2013.01); *G01V 3/165* (2013.01)

(58) Field of Classification Search
None
See application file for complete search history.

(56) References Cited

U.S. PATENT DOCUMENTS

2006/0015255 A1    1/2006   Sorensen
2006/0246962 A1   11/2006   Terzian et al.
(Continued)

FOREIGN PATENT DOCUMENTS

CN         201051150 Y     4/2008
CN         105510979 A     4/2016
(Continued)

OTHER PUBLICATIONS

International Search Report for corresponding PCT application WO2021197367 (Year: 2022).*

(Continued)

*Primary Examiner* — Lina Cordero

(57) ABSTRACT

A device for reducing turn-off time of a transient electromagnetic transmitting signal includes a transmitting coil, a first electronic switch to control connection mode of the transmitting coil and a second electronic switch configured to form a bridge arm. The transmitting coil is a twisted pair including a first wire and a second wire. The first wire is connected to one end of the second electronic switch. The other end of the second electronic switch is connected to one end of the first electronic switch. The other end of the first electronic switch is connected to the second wire. The connection mode of the transmitting coil includes head-to-head connection, head-to-tail connection and tail-to-tail connection between the first wire and the second wire. The first wire and the second wire are connected to form a transmitting loop.

7 Claims, 8 Drawing Sheets

(56) References Cited

U.S. PATENT DOCUMENTS

2013/0307346 A1* 11/2013 Arisawa .................. H02J 50/12
307/104
2016/0006268 A1* 1/2016 Arisawa .................. H02J 50/60
307/104
2019/0385788 A1* 12/2019 Arisawa .................. H01F 38/14

FOREIGN PATENT DOCUMENTS

| CN | 107332358 A |   | 11/2017 |
|----|-------------|---|---------|
| CN | 110137033 A | * | 8/2019  |
| CN | 111313916 A |   | 6/2020  |

OTHER PUBLICATIONS

CN107332358A, IDS record, translation (Year: 2017).*
CN201051150Y, IDS record, translation (Year: 2008).*
CN110137033A, translation (Year: 2019).*

* cited by examiner ture and
high reliability.
DEVICE AND METHOD FOR REDUCING TURN-OFF TIME OF TRANSIENT ELECTROMAGNETIC TRANSMITTING SIGNAL

CROSS-REFERENCE TO RELATED APPLICATIONS

This application is a continuation of International Patent Application No. PCT/CN2021/084292, filed on Mar. 31, 2021, which claims the benefit of priority from Chinese Patent Application No. 202010242759.6, filed on Mar. 31, 2020. The content of the aforementioned applications, including any intervening amendments thereto, is incorporated herein by reference in its entirety.

TECHNICAL FIELD

This application relates to electrical prospecting, and more particularity to a device and method for reducing turn-off time of a transient electromagnetic transmitting signal.

BACKGROUND

In the transient electromagnetic (TEM) method (also known as time domain electromagnetic method), a primary pulse magnetic field is transmitted to the ground through an ungrounded loop or grounded line source, and a secondary eddy current field is monitored via a coil or grounding electrode during an intermission of the primary pulse magnetic field. The attenuation process of the secondary eddy current field is generally divided into early, middle and late stages. The magnetic field at the early stage is equivalent to a high frequency component in a frequency domain, and has fast attenuation and small skin depth. While the magnetic field at the late stage is equivalent to a low frequency component in the frequency domain, and has slow attenuation and large skin depth. Geoelectrical characteristics in different depth can be obtained by measuring a variation law of the secondary magnetic field in each stage over time after the power off.

Currently, the ungrounded loop, as a commonly-used transmitting antenna for the transient electromagnetic exploration, is generally operated in the form of a full-bridge transmitting circuit connected by two sets of switches configured to form bridge arms and a transmitting loop to transmit the magnetic transmission of bipolar square-wave current. The transmitting loop usually adopts two or more turns of wires that are arranged into a square wireframe. An edge length of the transmitting wireframe is usually within a range from n×10 m to n×1 Km according to the exploration depth. In the case that the transmitting voltage U of the transient electromagnetic wireframe and the antenna remain unchanged, the turn-off time of the transmitting current in the wireframe will hardly change with time. Therefore, the measurement of a transient electromagnetic signal will be affected by the turn-off time, which may cause the early data distortion, failing to extracting and identifying the geological information of a shallow layer (small distance).

The turn-off time is represented as follows:

$$T_{\mathit{off}} \approx \frac{L}{R}\ln\frac{2U}{U+I_0R};$$

in which, L is an inductance of the transmitting loop; R is a resistance of the transmitting loop; $I_0$ is the current before turning off and U is an output voltage before turning off.

At present, how to reduce the turn-off time of a primary magnetic field still remains unsolved in the field of TEM exploration.

SUMMARY

In order to overcome the problems in prior art, the present disclosure provides a device and method for reducing turn-off time of a transient electromagnetic transmitting signal, where the device provided herein has simple structure and high reliability.

Technical solutions of the disclosure are described as follows.

In a first aspect, this application provides a device for reducing turn-off time of a transient electromagnetic transmitting signal, comprising:
a transmitting coil;
a first electronic switch; and
a second electronic switch;
wherein the first electronic switch is configured to control a connection mode of the transmitting coil; the second electronic switch is configured to form a bridge arm; the transmitting coil is a twisted pair; the twisted pair comprises a first wire and a second wire; the first wire is connected to one end of the second electronic switch; the other end of the second electronic switch is connected to a first end of the first electronic switch; a second end of the first electronic switch is connected to the second wire; the connection mode of the transmitting coil comprises head-to-head connection, tail-to-tail connection and head-to-tail connection between the first wire and the second wire; and the first wire and the second wire are connected to form a transmitting loop.

In some embodiments, the second electronic switch comprises a first switch, a second switch, a third switch and a fourth switch; one end of the first switch and one end of the fourth switch are connected together and then connected to a positive electrode of a power supply; the other end of the first switch and one end of the second switch are connected together to be configured as a first output electrode of the second electronic switch, and then connected to the first end of the first electronic switch; the other end of the fourth switch and one end of the third switch are connected together to be configured as a second output electrode of the second electronic switch, and then connected to a head end of the first wire; and the other end of the second switch and the other end of the third switch are connected together, and then connected to ground.

In some embodiments, the first electronic switch is a double-pole double-throw switch; the first electronic switch comprises an upper fixed contact, a lower fixed contact, a first upper movable contact, a first lower movable contact, a second upper movable contact and a second lower movable contact; the upper fixed contact and the lower fixed contact are arranged at a middle of the first electronic switch; the first upper movable contact and the first lower movable contact are arranged at a first end of the first electronic switch; and the second upper movable contact and the second lower movable contact are arranged at a second end of the first electronic switch; the upper fixed contact is connected to the first output electrode of the second electronic switch; the lower fixed contact is connected to a tail end of the first wire; the first upper movable contact and the second lower movable contact are both connected to a tail end of the second wire; and the first lower movable contact and the second upper movable contact are both connected to a head end of the second wire.

In some embodiments, for signal transmission, the upper fixed contact is connected to the first upper movable contact; the lower fixed contact of the first electronic switch is connected to the first lower movable contact; the tail end of the first wire is connected to the head end of the second wire; the head end of the first wire is connected to the second output electrode of the second electronic switch; the tail end of the second wire is connected to the first output electrode of the second electronic switch; and a magnetic field generated by a current in the first wire and a magnetic field generated by a current in the second wire have the same intensity and direction.

In some embodiments, when stopping the signal transmission, the first switch and the fourth switch are turned off, and the second switch and the third switch are turned on and connected to the ground; the upper fixed contact is connected to the second upper movable contact; the lower fixed contact of the first electronic switch is connected to the second lower movable contact; the tail end of the first wire is connected to the tail end of the second wire; the head end of the first wire is connected to the second output electrode of the second electronic switch; the head end of the second wire is connected to the first output electrode of the second electronic switch; a load output by the second electronic switch is the twisted pair, and the twisted pair is resistive and has an inductance of zero; and after turned off, if there is a current in the first wire and the second wire, the current in the first wire and the current in the second wire are equal in intensity and opposite in direction, and a magnetic field intensity generated by the twisted pair is zero.

In some embodiments, the transmitting loop is square, rectangular, circular or oval.

In a second aspect, this application provides a method for reducing turn-off time of a transient electromagnetic transmitting signal using the above-mentioned device, comprising:

(S1) determining whether a signal is a transmitting signal or a turn-off signal; if the signal is the transmitting signal, proceeding to step (S2); and if the signal is the turn-off signal, proceeding to step (S3);

(S2) turning off the second switch and the fourth switch and turning on the first switch and the third switch, or turning off the first switch and the third switch and turning on the second switch and the fourth switch; connecting the upper fixed contact to the first upper movable contact and connecting the lower fixed contact to the first lower movable contact to connect the tail end of the first wire to the head end of the second wire; connecting the head end of the first wire to the second output electrode of the second electronic switch; and connecting the tail end of the second wire to the first output electrode of the second electronic switch; wherein a magnetic field generated by a current in the first wire and a magnetic field generated by a current in the second wire have the same intensity and direction; and (S3) turning off the first switch and the fourth switch; turning on the second switch and the third switch followed by connection to the ground; connecting the upper fixed contact to the second upper movable contact and connecting the lower fixed contact to the second lower movable contact to connect the tail end of the first wire to the tail end of the second wire; connecting the head end of the first wire to the second output electrode of the second electronic switch; and connecting the head end of the second wire to the first output electrode of the second electronic switch; wherein a load output by the second electronic switch is the twisted pair, and the twisted pair is resistive and has an inductance of zero; and after turned off, if there is a current in the first wire and the second wire, the current in the first wire and the current in the second wire are equal in intensity and opposite in direction, and a magnetic field intensity generated by the twisted pair is zero.

Compared to the prior art, this application has the following beneficial effects.

The device provided herein can significantly reduce the turn-off time of the transmission current, such that the early channel signal can be effectively measured and a signal-to-noise ratio of a channel at a late stage is improved. As a consequence, geological information of a shallow layer (small distance) and a deep layer (large distance) can be effectively extracted through transient electromagnetic methods.

DETAILED DESCRIPTION OF EMBODIMENTS

Technical solutions of the present disclosure will be further described below with reference to the embodiments and accompanying drawings.

Figure 1:
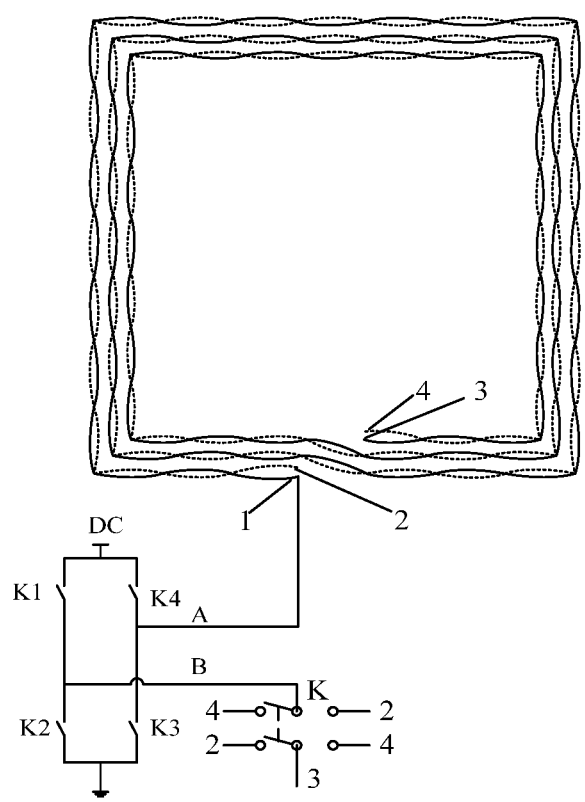
FIG. 1 schematically depicts a structure of a device for reducing turn-off time of a transient electromagnetic transmitting signal according to an embodiment of the present disclosure.

As shown in FIG. 1, a device for reducing turn-off time of a transient electromagnetic transmitting signal is provided. The device includes a transmitting coil, a first electronic switch and a second electronic switch. The first electronic switch is configured to control a connection mode of the transmitting coil. The second electronic switch is configured to form a bridge arm. The transmitting coil is a twisted pair including a first wire (denoted by a black solid line) and a second wire (denoted by a dotted line). The first wire is connected to one end of the second electronic switch. The other end of the second electronic switch is connected to one end of the first electronic switch. The other end of the first electronic switch is connected to the second wire. The connection mode of the transmitting coil includes head-to-head connection, tail-to-tail connection and head-to-tail connection between the first wire and the second wire. The first wire and the second wire are connected to form a transmitting loop.

In this embodiment, the transmitting loop is square, and it should be noted that the transmitting loop may also be square, rectangular, circular or oval, or in any regular or irregular shape.

The second electronic switch includes a first switch K1, a second switch K2, a third switch K3 and a fourth switch K4.

One end of the first switch K1 and one end of the fourth switch K4 are connected to each other and then connected to a positive electrode of a power supply. The other end of the first switch K1 and one end of the second switch K2 are connected to each other to be configured as an output electrode B of the second electronic switch and then connected to an end of the first electronic switch. The other end of the fourth switch K4 and one end of the third switch K3 are connected to each other to be configured as an output electrode A of the second electronic switch and then connected to a head end 1 of the first wire. The other end of the second switch K2 and the other end of the third switch K3 are connected and then connected to ground. When the second electronic switch is a N-channel enhancement-mode high-speed field effect transistor, each switch of the second electronic switch consists of two field effect transistors that are connected to each other, and drain electrodes of the two field effect transistors are configured as two contacts of each switch. When gate-source voltages ($V_{GS}$) of the two field effect transistors are at high level, the second electronic switch is turned on. When the $V_G$s of the two field effect transistors are at low level, the second electronic switch is turned off. Each bridge arm of the second electronic switch consists of a N-channel enhancement-mode high-speed field effect transistor. A drain electrode of the first switch K1 and a drain electrode of the fourth switch K4 are connected to the positive electrode of the power supply. A source electrode of the second switch K2 and a source electrode of the third switch K3 are connected to the ground. When the gate-source voltage of any switch of the second electronic switch is at high level, the second electronic switch is turned on. When the gate-source voltage of any switch of the second electronic switch is at low level, the second electronic switch is turned off.

The first electronic switch is a double-pole double-throw switch. The first electronic switch includes an upper fixed contact, a lower fixed contact, a first upper movable contact, a first lower movable contact, a second upper movable contact and a second lower movable contact. The upper fixed contact and the lower fixed contact are arranged at a middle of the first electronic switch. The first upper movable contact and the first lower movable contact are arranged at a first end of the first electronic switch; and the second upper movable contact and the second lower movable contact are arranged at a second end of the first electronic switch. The upper fixed contact is connected to the output electrode B of the second electronic switch. The lower fixed contact is connected to a tail end 3 of the first wire. The first upper movable contact and the second lower movable contact are both connected to a tail end 4 of the second wire. The first lower movable contact and the second upper movable contact are both connected to a head end 2 of the second wire.

For the signal transmission, the second switch K2 and the fourth switch K4 are turned off, and the first switch K1 and the third switch K3 are turned on, such that a negative-polarity current (A−, B+) is output. Alternatively, the first switch K1 and the third switch K3 are turned off, and the second switch K2 and the fourth switch K4 are turned on, such that a current with positive polarity (A+, B−) is output. Meanwhile, the first electronic switch is switched to the first end to connect the tail end of the first wire to the head end of the second wire. The head end of the first wire is connected to the output electrode A of the second electronic switch. The tail end of the second wire is connected to the output electrode B of the second electronic switch. A magnetic field generated by a current in the first wire and a magnetic field generated by a current in the second wire have the same intensity and direction.

Figure 2:
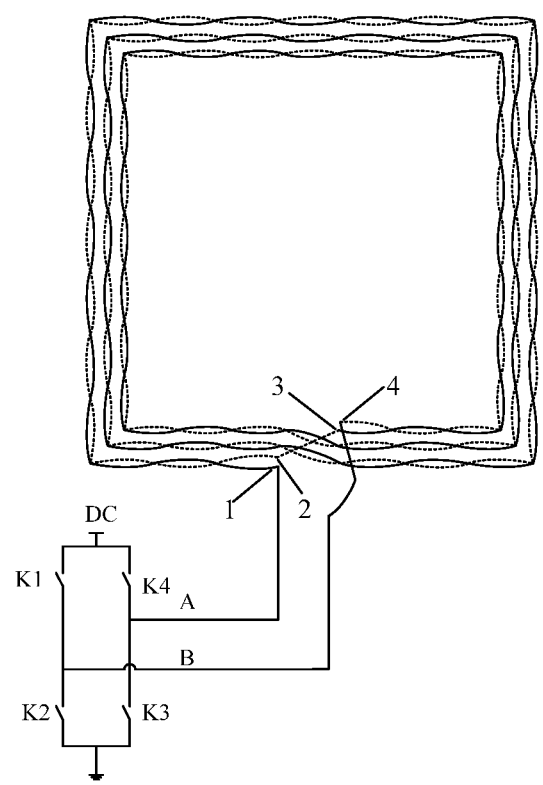
FIG. 2 is an equivalent circuit diagram of transmission of an electromagnetic signal.

When the first electronic switch is switched to the first end, the tail end of the first wire is connected to the head end of the second wire. The head end of the first wire is connected to the output electrode A of the second electronic switch. The tail end of the second wire is connected to the output electrode B of the second electronic switch. The magnetic field generated by a current in the first wire and a magnetic field generated by a current in the second wire have the same intensity and direction. It can be obviously observed from FIG. 2 that during the signal transmission, the two wires of the twisted pair are connected in series to generate magnetic fields having the same intensity and polarity, which are superimposed to be output.

Figure 3:
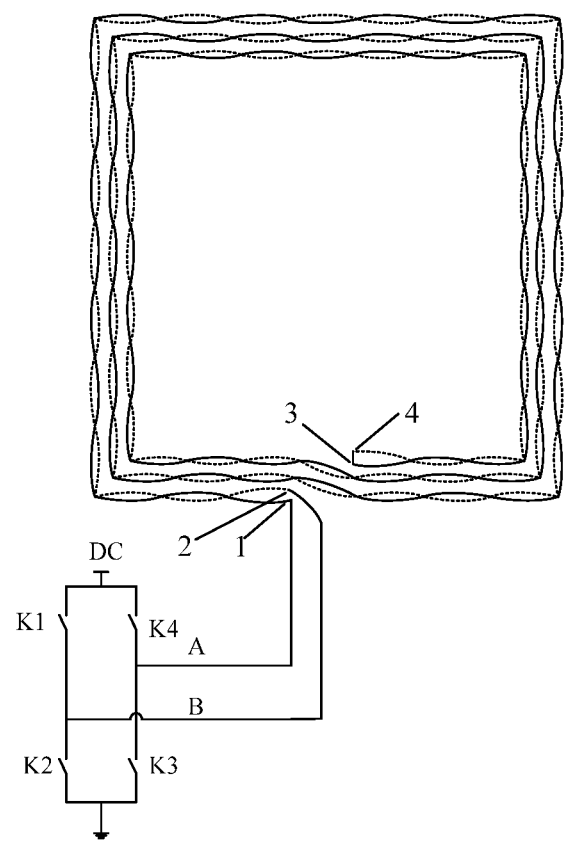
FIG. 3 is an equivalent circuit diagram when the transmission of the electromagnetic signal is turned off.

When it is required to stop the signal transmission, the first switch K1 and the fourth switch K4 are turned off, and the second switch K2 and the third switch K3 are turned on and connected to the ground. The first electronic switch is switched to the second end to connect the tail end of the first wire to the tail end of the second wire. The head end of the first wire is connected to the output electrode A of the second electronic switch. The head end of the second wire is connected to the output electrode B of the second electronic switch. At this time, a load output by the second electronic switch is the twisted pair, which is resistive and has an inductance of zero. After turned off, if there is a current in the first wire and the second wire, the current in the first wire and the current in the second wire are equal in intensity and opposite in direction, and a magnetic field intensity generated by the twisted pair is zero. As shown in FIG. 3, when turning off the current, the head end 1 of the first wire is connected to the output electrode A of the second electronic switch and the head end 2 of the second wire is connected to the output electrode B of the second electronic switch. The tail end 3 of the first wire is connected to the tail end 4 of the second wire to form a short connection. The second switch K2 and the third switch K3 are under saturated conduction and connected to the ground. In this case, the load output by the second electronic switch is a purely resistive load, and the turn-off time is mainly depended on a fall time of the switching circuit. Meanwhile, if there is a current in the twisted pair after turned off, the current in the first wire and the current in the second wire are equal in intensity and opposite in direction, and a magnetic field intensity generated by the twisted pair is zero.

A signal transmitting method using the above device is also provided herein, which includes the following steps.

(S1) Whether the signal is a transmitting signal or a turn-off signal is determined. If the signal is the transmitting signal, the step (S2) is performed, and if the signal is the turn-off signal, the step (S3) is conducted.

(S2) The upper fixed contact is connected to the first upper movable contact, and the lower fixed contact is connected to the first lower movable contact to connect the tail end of the first wire to the head end of the second wire. The head end of the first wire is connected to the output electrode A of the second electronic switch. The tail end of the second wire is connected to the output electrode B of the second electronic switch. A magnetic field generated by a current in the first wire and a magnetic field generated by a current in the second wire have the same intensity and direction.

(S3) The first switch K1 and the fourth switch K4 are turned off. The second switch K2 and the third switch K3 are turned on followed by connection to the ground. The upper fixed contact is connected to the second upper movable contact, and the lower fixed contact is connected to the second lower movable contact to connect the tail end of the first wire to the tail end of the second wire. The head end of the first wire is connected to the second output electrode of the second electronic switch. The head end of the second wire is connected to the first output electrode of the second electronic switch. A load output by the second electronic switch is the twisted pair, and the twisted pair is resistive and has an inductance of zero; and after turned off, if there is a current in the first wire and the second wire, the current in the first wire and the current in the second wire are equal in intensity and opposite in direction, and a magnetic field intensity generated by the twisted pair is zero.

Figure 4:
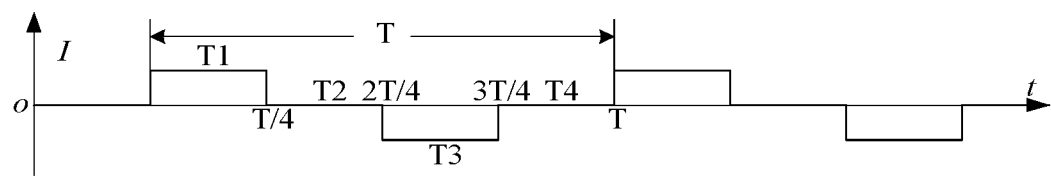
FIG. 4 illustrates a waveform of a bipolar square-wave current signal transmitted by transient electromagnetism.

As shown in FIG. 4, in an application of a transient electromagnetic method, a shorter turn-off time, a shallower observation blind zone, a higher signal-to-noise ratio of an acquired signal are desired to reduce an impact on a measurement.

Figure 5:
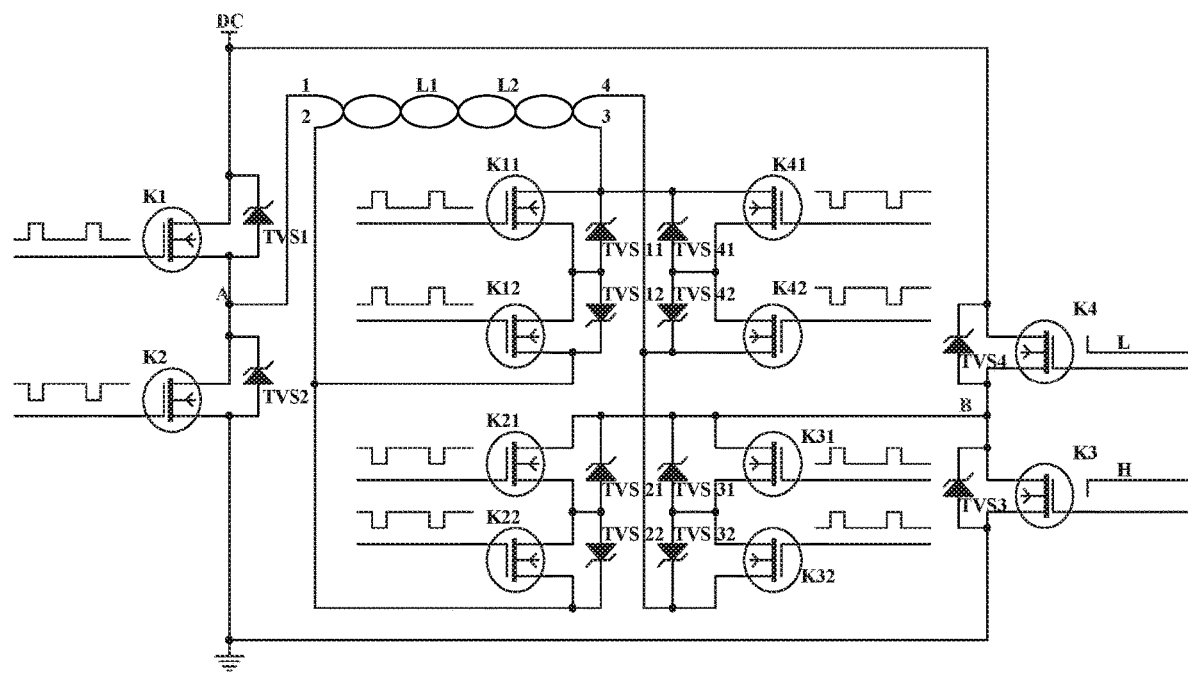
FIG. 5 is a circuit diagram of outputting a current with positive polarity.

FIG. 5 shows an embodiment of transmitting a current with positive polarity. The N-channel enhancement-mode high-speed field effect transistor is used as an electronic switch, for example, a gallium nitride field-effect transistor (GaN FET) or metal-oxide-semiconductor field-effect transistor (MOSFET). When the $V_{GS}$ is at high level, the N-channel enhancement-mode high-speed field effect transistor is under saturated conduction, that is, the switch is turned on. When the $V_{GS}$ is at low level, the N-channel enhancement-mode high-speed field effect transistor is turned off, that is, the switch is turned off. For the signal (A+, B−) transmission, a $V_{GS}$ of the first switch K1 and a $V_{GS}$ of the third switch K3 are at high level and the first switch K1 and the third switch K3 are under saturated conduction; a $V_{GS}$ of the second switch K2 and a $V_{GS}$ of the fourth switch K4 are at low level and the second switch K2 and the fourth switch K4 are turned off. A current is output from the output electrode A, input to the head end 1 of the first wire and then output from the tail end 3 of the first wire. Then the current flows through a fifth switch K11 and a sixth switch K12 that are under saturated conduction and then is input to the head end 2 of the second wire and output from the tail end 4 of the second wire. After passing through a seventh switch K31 and an eighth switch K32 that are under saturated conduction, the current returns to the output electrode B. When turning off the current ($V_A$=0, $V_B$=0), the first switch K1 and the fourth switch K4 are turned off. The second switch K2 and the third switch K3 are turned on and connected to the ground. The fifth switch K11, the sixth switch K12, the seventh switch K31 and the eighth switch K32 are turned off. A ninth switch K41, a tenth switch K42, an eleventh switch K21 and a twelfth switch K22 are turned on. The tail end 3 of the first wire is connected to the tail end 4 of the second wire through the ninth switch K41 and the tenth switch K42 that are under saturated conduction. The head end 2 of the second wire is connected to the output electrode B through the eleventh switch K21 and the twelfth switch K22 that are under saturated conduction. The output electrode A is connected to the output electrode B through the second switch K2 and the third switch K3 that are under saturated conduction and then connected to a power ground. The drain electrode of each field effect transistor is connected to a cathode of a transient voltage suppression diode. An anode of the transient voltage suppression diode is connected to a source electrode of the same field effect transistor. A minimum reverse breakdown voltage of the transient voltage suppression diode should be slightly lower than a breakdown voltage of the field effect transistor so as to protect the field effect transistor and improve a reliability of the transmitting loop.

Figure 6:
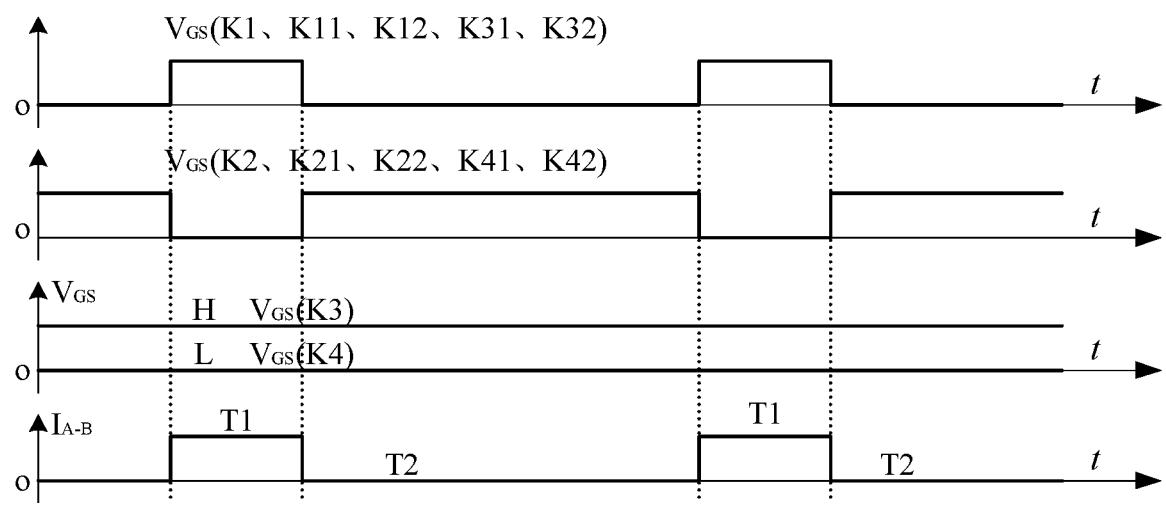
FIG. 6 schematically depicts a waveform of a key point when outputting the current with positive polarity.

As shown in FIGS. 5 and 6, when outputting the current with positive polarity (A+, B−), an output current waveform $I_{A-B}$ is corresponded to a first segment T1. A $V_{GS}$ of the first switch K1, a $V_{GS}$ of the fifth switch K11, a $V_{GS}$ of the sixth switch K12, a $V_{GS}$ of the seventh switch K31 and a $V_{GS}$ of the eighth switch K32 are at high level and the first switch K1, the fifth switch K11, the sixth switch K12, the seventh switch K31 and the eighth switch K32 are under saturated conduction. A $V_{GS}$ of the second switch K2, a $V_{GS}$ of the eleventh switch K21, a $V_{GS}$ of the twelfth switch K22, a $V_{GS}$ of the ninth switch K41 and a $V_{GS}$ of the tenth switch K42 are zero. A $V_{GS}$ of the third switch K3 is at high level. A $V_{GS}$ of the fourth switch K4 is at low level. A current is output from a positive electrode (DC end) of a DC power supply and flows to the output electrode A through the first switch K1 that is under saturated conduction, passes through the first wire L1 from the head end 1 of the first wire L1 and flows to the tail end 3 of the first wire L1. After passing through the fifth switch K11 and the sixth switch K12 that are under saturated conduction, the current passes through the second wire L2 from the head end 2 of the second wire L2 to the tail end 4 of the second wire L2, flows to the output electrode B through the seventh switch K31 and the eighth switch K32 that are under saturated conduction and then flows to the power ground. When turning off the current, the output current waveform $I_{A-B}$ is corresponded to a second segment T2. The $V_{GS}$ of the first switch K1, the $V_{GS}$ of the fifth switch K11, the $V_{GS}$ of the sixth switch K12, the $V_{GS}$ of the seventh switch K31 and the $V_{GS}$ of the eighth switch K32 are zero. The $V_{GS}$ of the third switch K3, the $V_{GS}$ of the eleventh switch K21, the $V_{GS}$ of the twelfth switch K22, the $V_{GS}$ of the ninth switch K41 and the $V_{GS}$ of the tenth switch K42 are at high level, and the third switch K3, the eleventh switch K21, the twelfth switch K22, the twelfth switch K22, the ninth switch K41 and the tenth switch K42 are under saturated conduction. The $V_{GS}$ of the second switch K2 is at high level. The $V_{GS}$ of the fourth switch K4 is at low level. The head end 1 of the first wire L1 is connected to the ground through the second switch K2 that is under saturated conduction. The head end 2 of the second wire L2 is connected to the ground through the eleventh switch K21, the twelfth switch K22 and the third switch K3 that are all under saturated conduction. The tail end 4 of the second wire L2 and the tail end 3 of the first wire L1 form a short circuit through the ninth switch K41 and the tenth switch K42 that are under saturated conduction.

Figure 7:
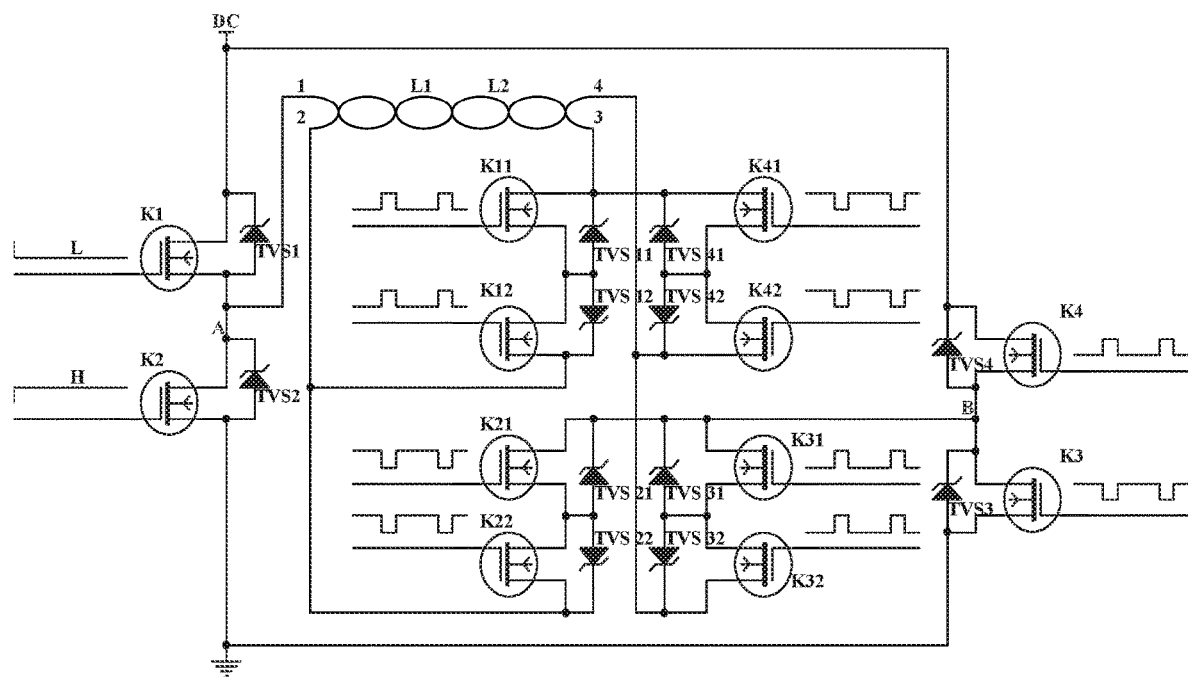
FIG. 7 is a circuit diagram of outputting a current with negative polarity.

FIG. 7 shows an embodiment of transmitting a current with negative polarity. The N-channel enhancement-mode high-speed field effect transistor is used as the electronic switch, for example, a GaN FET or an MOSFET. When the $V_G$s is at high level, the N-channel enhancement-mode high-speed field effect transistor is under saturated conduction, that is, the switch is turned on. When the $V_{GS}$ is at low level, the N-channel enhancement-mode high-speed field effect transistor is turned off, that is, the switch is turned off. For a signal (A−, B+) transmission, the $V_{GS}$ of the second switch K2 and the $V_{GS}$ of the fourth switch K4 are at high level and the second switch K2 and the fourth switch K4 are under saturated conduction. The $V_{GS}$ of the first switch K1 and the $V_{GS}$ of the third switch K3 are at low level and the first switch K1 and the third switch K3 are turned off. The fifth switch K11, the sixth switch K12, the seventh switch K31 and the eighth switch K32 are under saturated conduction, and have a high-level $V_{GS}$. The ninth switch K41, the ninth switch K41, the eleventh switch K21 and the twelfth switch K22 are turned off, and have a $V_{GS}$ of 0. A current is output from the positive electrode (DC end) of the DC power supply and flows to the output electrode B through the fourth switch K4 that is under saturated conduction. The current is then output from the output electrode B, flows to the tail end 4 of the second wire L2 through the seventh switch K31 and the eighth switch K32 that are under saturated conduction. The head end 2 of the second wire L2 is connected to the tail end 4 of the first wire L1 through the fifth switch K11 and the sixth switch K12 that are under saturated conduction. The head end 1 of the first wire L1 is connected to the power ground through the second switch K2 that are under saturated conduction. When turns off the current, the $V_{GS}$ of the first switch K1 and the $V_{GS}$ of the fourth switch K4 are at low level, and the first switch K1 and the fourth switch K4 are turned off. The $V_{GS}$ of the second switch K2 and the $V_{GS}$ of the third switch K3 are at high level. The second switch K2 and the third switch K3 are conducted, and are connected to the ground. $V_A=0$. $V_B=0$. The fifth switch K11, the sixth switch K12, the seventh switch K31 and the eighth switch K32 are turned off, and have a $V_{GS}$ of 0. The ninth switch K41, the tenth switch K42, the eleventh switch K21 and the twelfth switch K22 are under saturated conduction, and have a high-level $V_{GS}$. The tail end 3 of the first wire L1 is and the tail end 4 of the second wire L2 form a short circuit through the ninth switch K41 and the tenth switch K42 that are under saturated conduction. The head end 2 of the second wire L2 is connected to the output electrode B through the eleventh switch K21 and the twelfth switch K22 that are conducted. The output electrode A and the output electrode B are connected to the ground through the second switch K2 and the third switch K3 that are under saturated conduction. A drain electrode of each N-channel enhancement-mode high-speed field effect transistor is connected to a cathode of a transient voltage suppression diode and an anode of the transient voltage suppression diode is connected to a source of the same N-channel enhancement-mode high-speed field effect transistor. A minimum reverse breakdown voltage of the transient voltage suppression diode is slightly lower than the breakdown voltage of the N-channel enhancement-mode high-speed field effect transistor, so as to protect the N-channel enhancement-mode high-speed field effect transistor and improve the reliability of the transmitting loop.

Figure 8:
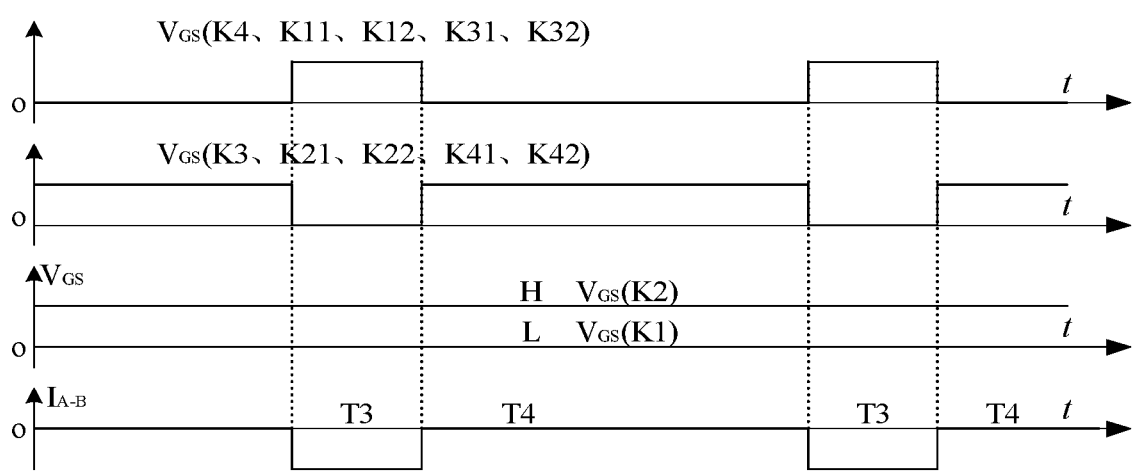
FIG. 8 schematically depicts a waveform of a key point when outputting the current with negative polarity.

As shown in FIGS. 7 and 8, when outputting the current with negative polarity, the output current waveform $I_{A-B}$ is corresponded to a third segment T3. The fourth switch K4, the fifth switch K11, the sixth switch K12, the seventh switch K31 and the eighth switch K32 are under saturated conduction, and have a high-level $V_{GS}$. The third switch K3, the eleventh switch K21, the twelfth switch K22, the ninth switch K41 and the tenth switch K42 are turned off, and have a $V_{GS}$ of 0. The $V_{GS}$ of the second switch K2 is at high level, and the second switch K2 is turned on. The $V_{GS}$ of the first switch K1 is at low level, and the first switch K1 is turned off. A current is output from the positive electrode (DC end) of the DC power supply, flows to the output electrode B through the fourth switch K4 that is under saturated conduction, and then flows to the tail end 4 of the second wire L2 through the seventh switch K31 and the eighth switch K32 that are under saturated conduction. The current then flows from the head end 2 of the second wire L2 to the tail end 3 of the first wire L1 through the fifth switch K11 and the sixth switch K12 that are under saturated conduction. The head end 1 of the first wire L1 are connected to the ground through the second switch K2 that is under saturated conduction. A magnetic field generated by the current in the first wire L1 and a magnetic field generated by the current in the second wire L2 have the same intensity and direction, and are output after a superposition. When the current is turned off, the output current waveform $I_{A-B}$ is corresponded to a fourth segment T4. The $V_{GS}$ of the fourth switch K4, the $V_{GS}$ of the fifth switch K11, the $V_{GS}$ of the sixth switch K12, the $V_{GS}$ of the seventh switch K31 and the $V_{GS}$ of the eighth switch K32 are zero. The third switch K3, the eleventh switch K21, the twelfth switch K22, the ninth switch K41 and the switch K2 are under saturated conduction, and have high-level $V_{GS}$. The second switch K2 is under saturated conduction, and has high-level $V_{GS}$. The first switch is turned off, and has low-level $V_{GS}$. The head end 1 of the first wire L1 is connected to the ground through the second switch K2 that is under saturated conduction. The head end 2 of the second wire L2 is connected to the ground through the eleventh switch K21, the twelfth switch K22 and the third switch K3 that all are under saturated conduction. The tail end 4 of the second wire L2 and the tail end 3 of the first wire L1 form a short circuit through the ninth switch K41 and the tenth switch K42 that are under saturated conduction.

The device and the method are used to transmit a bipolar square wave in the embodiments provided herein. It should be noted that the device and the method provided herein can also be used to transmit a bipolar rectangular wave, a bipolar combined rectangular wave, a unipolar square wave, a unipolar rectangular wave and a unipolar combined rectangular wave.

The device provided herein is not only applicable to the transmission of a transient electromagnetic signal, but also to the transmission of other controlled-source electromagnetic prospecting signals transmitted by a magnetic transmitting source.

For the signal transmission using a small-sized transmitting coil, a soft magnetic material with high magnetic permeability may be placed in the wire frame to reduce a size of a transmitting antenna and enhance the signal transmission strength and portability. The placement of a high permeability soft magnetic material in the transmitting coil for transmitting a magnetic field should fall within the scope of the present disclosure defined by the appended claims.

What is claimed is:

1. A device for reducing turn-off time of a transient electromagnetic transmitting signal, comprising:
   a transmitting coil;
   a first electronic switch; and
   a second electronic switch;
   wherein the first electronic switch is configured to control a connection mode of the transmitting coil; the second electronic switch is configured to form a bridge arm; the transmitting coil is a twisted pair; the twisted pair comprises a first wire and a second wire; the first wire is connected to a first end of the second electronic switch; a second end of the second electronic switch is connected to a first end of the first electronic switch; a second end of the first electronic switch is connected to the second wire; the connection mode of the transmitting coil comprises head-to-head connection, tail-to-tail connection and head-to-tail connection between the first wire and the second wire; and the first wire and the second wire are connected to form a transmitting loop.

2. The device of claim 1, wherein the second electronic switch comprises a first switch, a second switch, a third switch and a fourth switch; a first end of the first switch and a first end of the fourth switch are connected together and then connected to a positive electrode of a power supply; a second end of the first switch and a first end of the second switch are connected together to be configured as a first output electrode of the second electronic switch, and then connected to the first end of the first electronic switch; a second end of the fourth switch and a first end of the third switch are connected together to be configured as a second output electrode of the second electronic switch, and then connected to a head end of the first wire; and a second end of the second switch and a second end of the third switch are connected together, and then connected to ground.

3. The device of claim 2, wherein the first electronic switch is a double-pole double-throw switch; the first electronic switch comprises an upper fixed contact, a lower fixed contact, a first upper movable contact, a first lower movable contact, a second upper movable contact and a second lower movable contact; the upper fixed contact and the lower fixed contact are arranged at a middle of the first electronic switch; the first upper movable contact and the first lower movable contact are arranged at a first side of the first electronic switch; and the second upper movable contact and the second lower movable contact are arranged at a second side of the first electronic switch; the upper fixed contact is connected to the first output electrode of the second electronic switch; the lower fixed contact is connected to a tail end of the first wire; the first upper movable contact and the second lower movable contact are both connected to a tail end of the second wire; and the first lower movable contact and the second upper movable contact are both connected to a head end of the second wire.

4. The device of claim 3, wherein for signal transmission, the upper fixed contact is connected to the first upper movable contact; the lower fixed contact is connected to the first lower movable contact; the tail end of the first wire is connected to the head end of the second wire; the head end of the first wire is connected to the second output electrode of the second electronic switch; the tail end of the second wire is connected to the first output electrode of the second electronic switch; and a magnetic field generated by a current in the first wire and a magnetic field generated by a current in the second wire have a same intensity and direction.

5. The device of claim 3, wherein when stopping signal transmission, the first switch and the fourth switch are turned off, and the second switch and the third switch are turned on and connected to the ground; the upper fixed contact is connected to the second upper movable contact; the lower fixed contact is connected to the second lower movable contact; the tail end of the first wire is connected to the tail end of the second wire; the head end of the first wire is connected to the second output electrode of the second electronic switch; the head end of the second wire is connected to the first output electrode of the second electronic switch; a load output by the second electronic switch is the twisted pair, and the twisted pair is resistive and has an inductance of zero; and after turned off, if there is a current in the first wire and a current in the second wire, the current in the first wire and the current in the second wire are equal in intensity and opposite in direction, and a magnetic field intensity generated by the twisted pair is zero.

6. A method for reducing turn-off time of a transient electromagnetic transmitting signal using the device of claim 3, comprising:
(S1) determining whether a signal is a transmitting signal or a turn-off signal; if the signal is the transmitting signal, proceeding to step (S2); and if the signal is the turn-off signal, proceeding to step (S3);
(S2) turning off the second switch and the fourth switch and turning on the first switch and the third switch; or turning off the first switch and the third switch, and turning on the second switch and the fourth switch; connecting the upper fixed contact to the first upper movable contact and connecting the lower fixed contact to the first lower movable contact to connect the tail end of the first wire to the head end of the second wire; connecting the head end of the first wire to the second output electrode of the second electronic switch; and connecting the tail end of the second wire to the first output electrode of the second electronic switch; wherein a magnetic field generated by a current in the first wire and a magnetic field generated by a current in the second wire have a same intensity and direction; and
(S3) turning off the first switch and the fourth switch; turning on the second switch and the third switch followed by connection to the ground; connecting the upper fixed contact to the second upper movable contact and connecting the lower fixed contact to the second lower movable contact to connect the tail end of the first wire to the tail end of the second wire; connecting the head end of the first wire to the second output electrode of the second electronic switch; and connecting the head end of the second wire to the first output electrode of the second electronic switch; wherein a load output by the second electronic switch is the twisted pair, and the twisted pair is resistive and has an inductance of zero; and after turned off, if there is the current in the first wire and the current in the second wire, the current in the first wire and the current in the second wire are equal in intensity and opposite in direction, and a magnetic field intensity generated by the twisted pair is zero.

7. The device of claim 1, wherein the transmitting loop is square, rectangular, circular or oval.

* * * * *